US011126686B2

(12) United States Patent
Wang

(10) Patent No.: US 11,126,686 B2
(45) Date of Patent: Sep. 21, 2021

(54) PROCESSING IMAGE DATA OF A WEBPAGE

(71) Applicant: Advanced New Technologies Co., Ltd., George Town (KY)

(72) Inventor: Chao Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 10 days.

(21) Appl. No.: 16/210,534

(22) Filed: Dec. 5, 2018

(65) Prior Publication Data

US 2019/0108189 A1 Apr. 11, 2019

Related U.S. Application Data

(63) Continuation of application No. PCT/CN2017/085652, filed on May 24, 2017.

(30) Foreign Application Priority Data

Jun. 6, 2016 (CN) .......................... 201610394102.5

(51) Int. Cl.
*G06F 16/957* (2019.01)
*G06F 40/143* (2020.01)
(Continued)

(52) U.S. Cl.
CPC ............ *G06F 16/9577* (2019.01); *G06F 8/30* (2013.01); *G06F 16/955* (2019.01);
(Continued)

(58) Field of Classification Search
CPC .. G06F 16/955; G06F 16/958; G06F 16/9577; G06F 40/14; G06F 8/30
(Continued)

(56) References Cited

U.S. PATENT DOCUMENTS

2007/0130525 A1 6/2007 Murphy et al.
2010/0153544 A1* 6/2010 Krassner ................. G06F 40/14
709/224

(Continued)

FOREIGN PATENT DOCUMENTS

CN 102456136 5/2012
CN 102819386 12/2012
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Stephen S Hong
*Assistant Examiner* — Broderick C Anderson
(74) *Attorney, Agent, or Firm* — Fish & Richardson P.C.

(57) ABSTRACT

A request for a webpage is received at a server associated with a website and from a terminal device, where the webpage includes an image, and where the server stores a first set of HyperText Markup Language (HTML) code that is associated with the webpage. The image is divided into a plurality of sub-images. A second set of HTML code associated with the webpage is determined, where the second set of HTML code includes code corresponding to each sub-image. The second set of HTML code is transmitted to the terminal device for sequential display of each sub-image on the terminal device.

17 Claims, 6 Drawing Sheets

(51) Int. Cl.
*G06F 16/955* (2019.01)
*G06F 16/958* (2019.01)
*G06F 8/30* (2018.01)
*G06K 9/00* (2006.01)

(52) U.S. Cl.
CPC .......... *G06F 16/958* (2019.01); *G06F 40/143* (2020.01); *G06K 9/00442* (2013.01); *Y02D 10/00* (2018.01)

(58) Field of Classification Search
USPC ........................................................ 715/234
See application file for complete search history.

(56) References Cited

U.S. PATENT DOCUMENTS

| | | | |
|---|---|---|---|
| 2011/0158557 A1* | 6/2011 | Ge | H04N 21/8456 382/305 |
| 2012/0194519 A1* | 8/2012 | Bissell | G06F 16/9577 345/428 |
| 2016/0117061 A1* | 4/2016 | Hodgart | G06T 1/0007 715/733 |
| 2016/0284317 A1 | 9/2016 | Yao et al. | |
| 2018/0218171 A1 | 8/2018 | Bellala et al. | |
| 2020/0125610 A1 | 4/2020 | Wang | |

FOREIGN PATENT DOCUMENTS

| | | | | |
|---|---|---|---|---|
| CN | 102819560 | | 12/2012 | |
| CN | 103488447 | | 1/2014 | |
| CN | 103514241 | | 1/2014 | |
| CN | 103701756 | | 4/2014 | |
| CN | 104391890 | | 3/2015 | |
| CN | 104679570 | | 6/2015 | |
| JP | 2005071350 | | 3/2005 | |
| JP | 2012181645 | | 9/2012 | |
| JP | 2014164126 | | 9/2014 | |
| JP | 2015111436 | | 6/2015 | |
| TW | 201502819 | | 1/2015 | |
| WO | WO-2009073831 A1 | * | 6/2009 | ........... A63F 13/358 |

OTHER PUBLICATIONS

Nakamoto, "Bitcoin: A Peer-to-Peer Electronic Cash System," www.bitcoin.org, 2005, 9 pages.

PCT International Preliminary Report on Patentability in International No. PCT/CN2017/085652, dated Dec. 11, 2018, 7 pages (with English translation).

PCT Written Opinion of the International Searching Authority in International Application No. PCT/CN2017/085652, dated Aug. 29, 2017, 6 pages (with English translation).

European Extended Search Report in European Application No. 17809629.3, dated Apr. 1, 2019, 8 pages.

International Search Report by the International Searching Authority issued in International Application No. PCT/CN2017/085652 dated Aug. 29, 2017; 8 pages.

Anonymous [online], "javascript—How can I set Image source with base64—Stack Overflow", dated May 8, 2013, retrieved on Jun. 22, 2021, retrieved from URL<https://stackoverflow.com/questions/16449445/how-can-i-set-image-sou rce-wi th-base64 >, 4 pages.

Mohassel et al., "SecureML: A system for scalable privacy-preserving machine learning," 2017 IEEE Symposium on Security and Privacy (SP), May 22, 2017, 20 pages.

Kibuki et al., "Designs and Implementations of Efficient and Accurate Secret Logistics Regression," 2018 Computer Security Symposium, Oct. 2018,10 pages (with English abstract).

* cited by examiner

PROCESSING IMAGE DATA OF A WEBPAGE

CROSS-REFERENCE TO RELATED APPLICATIONS

This application is a continuation of PCT Application No. PCT/CN2017/085652, filed on May 24, 2017, which claims priority to Chinese Patent Application No. 201610394102.5, filed on Jun. 6, 2016, and each application is hereby incorporated by reference in its entirety.

TECHNICAL FIELD

The present application relates to the field of information technologies, and in particular, to a data processing method and device.

BACKGROUND

Development of the information-based society is accompanied with people's increasing dependency on network. Moreover, as mobile intelligent terminal devices develop, people are more likely to execute services by using the mobile intelligent terminal devices (such as mobile phones and tablet computers; referred to as terminal devices for short).

Generally, when a browser of a terminal device is used for browsing a web page, if there is an image on the web page, the terminal device can display the image on the web page only after running the code corresponding to the web page by using the browser and loading the image. This is why when a person browses the web page by using the browser in the terminal device, text on the web page is first displayed and the image on the web page is displayed later. When the user is waiting for the image to display, the browser of the terminal device is actually loading the image on the web page. When the image on the web page occupies large space (in other words, a size of the image is large), the browser may load a larger volume of data during the loading operation, and can take longer time to load. In addition, as an image serves as a whole data to be loaded, only after all data of the image is loaded, the browser of the terminal device can display the image accordingly.

Based on the description above, it can be seen that the terminal device takes more time to load a larger image. As a result, the user may incorrectly identify a web page loading error and attempt to reload the web page repeatedly. As such, network running load and terminal device running load both increase, web page browsing experience of the user is deteriorated, and the user is less interested in browsing the web page.

To alleviate this problem, in the existing technology, an image on a web page is divided into a plurality of sub-images that occupy smaller space, and each sub-image is written into the code of the web page. As such, when opening the web page, the browser of the terminal device does not need to load the entire image to display content of the image, but displays image content corresponding to a sub-image that has been loaded. In other words, when a user uses the terminal device to browse the web page, the image on the web page is displayed part by part (that is, the sub-images are sequentially displayed on the web page). As a sub-image occupies small space, the sub-image is loaded relatively fast, and the user can quickly view partial content of the image (namely, content of the sub-image), thereby alleviating a case that the user incorrectly identifies a web page loading error, and further alleviating repeated loading of the web page by the user, and improving the user's web page browsing experience.

Generally, a process of loading the image of the web page by the browser of the terminal device is as follows: First, a loading address (for example, a server address) of the image is recorded in a HyperText Markup Language (HTML) <img> tag of the web page provided by a web page server. When a browser of any terminal device loads code of the HTML web page and runs to the <img> tag, the browser of the terminal device can send an invoking request to a server corresponding to the image loading address based on the image loading address recorded in the <img> tag, so that the server corresponding to the image loading address can return corresponding data (namely, the image), and the browser can render the received image to the web page by using the <img> tag, then the user can eventually view the image.

In addition, in the existing technology, sub-images on a web page are stored in a content delivery network (CDN) to alleviate device running load, in other words, the sub-images can be stored in different servers. Therefore, the addresses of the sub-images recorded in <img> tags in HTML code of the web page can be addresses of different servers.

Further, each time the terminal device initiates an invoking request is a process of establishing a communication channel. The process of establishing a communication channel consumes a large quantity of electric energy resources of the terminal device (in other words, establishing a communication channel is an operation with high electric power consumption, and causes much higher electric power consumption). However, in the existing technology, because an image on a web page is generally divided into a plurality of sub-images, each sub-image's invoking request needs to be initiated separately, that is, each communication channel needs to be established, for each sub-image when the terminal device browses the web page. Moreover, because the sub-images can be stored in different servers, the terminal device may further need to send invoking requests to a plurality of servers.

It can be seen that, a web page image loading method in the existing technology causes a sharp increase of electric power consumption of a terminal device, resulting in a shorter use time of the terminal device and affecting use efficiency of the terminal device.

SUMMARY

Implementations of the present application provide a data processing method, to reduce a problem in the existing technology that after an image on a web page is divided into a plurality of sub-images, a terminal device needs to send an invoking request for each sub-image, increasing electric power consumption of the terminal device and affecting use efficiency of the terminal device.

Implementations of the present application provide another data processing method, to reduce a problem in the existing technology that after an image on a web page is divided into a plurality of sub-images, a terminal device needs to send an invoking request for each sub-image, increasing electric power consumption of the terminal device and affecting use efficiency of the terminal device.

Implementations of the present application provide a data processing device, to reduce a problem in the existing technology that after an image on a web page is divided into a plurality of sub-images, a terminal device needs to send an invoking request for each sub-image, increasing electric power consumption of the terminal device and affecting use efficiency of the terminal device.

Implementations of the present application provide another data processing device, to reduce a problem in the existing technology that after an image on a web page is divided into a plurality of sub-images, a terminal device needs to send an invoking request for each sub-image, increasing electric power consumption of the terminal device and affecting use efficiency of the terminal device.

The following technical solutions are used in implementations of the present application:

A data processing method includes the following: receiving a request, dedicated for a web page that is sent by a terminal device, where the web page includes an image; determining HyperText Markup Language (HTML) code of the web page, where the HTML code includes code corresponding to each sub-image, and all sub-images are obtained by dividing the image; and sending the HTML code to the terminal device, so that after receiving the HTML code, the terminal device can display each sub-image, based on the code included in the HTML code that corresponds to each sub-image.

A data processing method includes the following: sending a request dedicated for a web page to a server; receiving HTML code of the web page that returned by the server, where the web page includes an image, and the HTML code of the web page includes code corresponding to each of several sub-images obtained by dividing the image; and rendering, for each piece of code, a sub-image corresponding to the code to the web page by running the HTML code of the web page.

A data processing device includes the following: a receiving module, configured to receive a request that is dedicated for a web page and sent by a terminal device, where the web page includes an image; an determination module, configured to determine HTML code of the web page, where the HTML code includes code corresponding to each sub-image, and all sub-images are obtained by dividing the image; and a sending module, configured to send the HTML code to the terminal device, so that after receiving the HTML, the terminal device displays each sub-image based on the code that is corresponding to each sub-image and included in the HTML code.

A data processing device includes the following: a sending module, configured to send a request dedicated for a web page to a server; a receiving module, configured to receive HTML code of the web page which is returned by the server, where the web page includes an image, and the HTML code of the web page includes code corresponding to each of several sub-images obtained by dividing the image; and a rendering module, configured to render, for each piece of code, a sub-image corresponding to the code to the web page by running the HTML code of the web page.

The at least one technical solution used in the implementations of the present application can achieve the following beneficial effects:

After dividing an image on a web page into several sub-images, a server can convert each sub-image into code corresponding to the sub-image, and writes each piece of code into HTML code of the web page. As such, after receiving the web page, a terminal device can run the HTML code of the web page to render a sub-image corresponding to each piece of code to the web page, without a need to send an invoking request for each sub-image. Therefore, the terminal device does not need to establish a plurality of communication channels. As such, when the terminal device loads the image on the web page, it can be ensured that a user can quickly view partial content of the image, thereby alleviating repeated loading of the web page by the user, reducing electric power consumption of the terminal device, and improving use efficiency of the terminal device.

BRIEF DESCRIPTION OF DRAWINGS

The accompanying drawings here are used to provide further understanding of the present application, and constitute a part of the present application. Example implementations of the present application and descriptions of the implementations are used to explain the present application, and do not constitute an improper limitation to the present application. In the accompanying drawings.

DESCRIPTION OF IMPLEMENTATIONS

To make the objectives, technical solutions, and advantages of the present application clearer, the following clearly and comprehensively describes the technical solutions of the present application with reference to the specific implementations and the corresponding accompanying drawings of the present application. Apparently, the described implementations are some rather than all of the implementations of the present application. All other implementations obtained by a person of ordinary skill in the art based on the implementations of the present application without creative efforts shall fall within the protection scope of the present application.

The technical solutions provided by the implementations of the present application are described in detail below with reference to the accompanying drawings.

Figure 1:
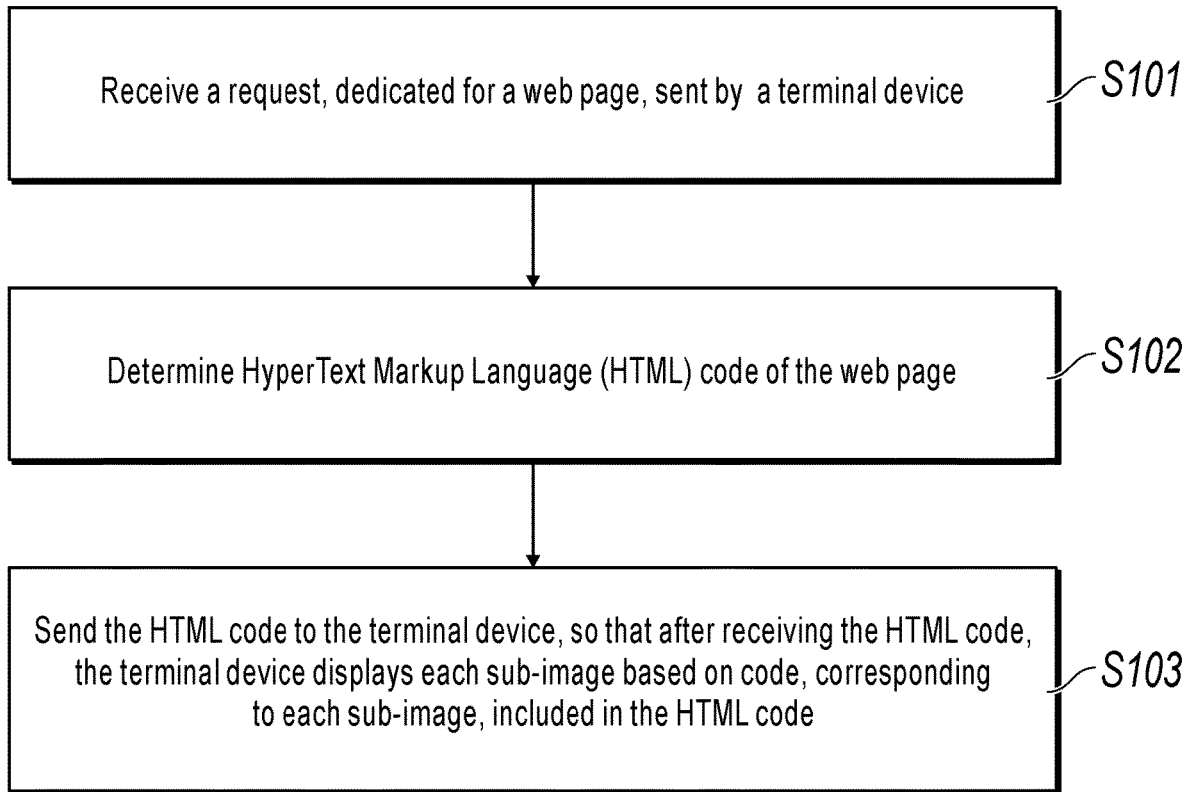
FIG. 1 illustrates a data processing process, according to an implementation of the present application.

FIG. 1 illustrates a data processing process, according to an implementation of the present application. The process includes the following steps:

S101: Receive a request that is dedicated for a web page and sent by a terminal device.

In the existing technology, a web page is generally compiled by using HyperText Markup Language (HTML) code. In addition, after receiving a request that is dedicated for the web page and sent by a terminal device, a server can return HTML code of the web page to the terminal device based on the request, so that the terminal device can display the web page after receiving the HTML code of the web page.

Therefore, same as the existing technology, in this implementation of the present application, a server can receive the request sent by the terminal device that is dedicated for the web page.

Because the web page can include an image, the data in the present application can be data corresponding to the image. In addition, the server receives the request dedicated for the web page, and therefore the image can be an image on the web page, that is, an image displayed on the web page. The server can be one standalone device, or a system constituted by a plurality of devices. When the server is a system constituted by a plurality of devices, a device receiving the request dedicated for the web page and a device storing the image included by the web page can be different devices.

Further, the data processing method described in the present application is dedicated for an image on a web page. Thus, in the present application, the web page can include at least one image. In addition, for ease of subsequent description, an example in which the web page includes only one image is used for illustration in the present application.

For example, assume that server A of a certain website is configured to receive a request that is dedicated for a web page, of a terminal device, and return corresponding HTML code of the web page based on the received request. Therefore, server A can store HTML code of several web pages and each image included by each web page. Further, assume that server A receives a request dedicated for web page a sent by a terminal device. For ease of description and illustration, subsequently, an example in which server A stores code of only web page a, and web page a includes only image x, is used for illustration.

S102: Determine HTML code of the web page.

In this implementation of the present application, after receiving the request that is dedicated for the web page and sent by the terminal device, because the server stores HTML code of all web pages, the server can determine the HTML code of the web page corresponding to the request based on the request, the server can conveniently send the HTML code of the web page to the terminal device afterwards.

However, the web page further includes an image. Therefore, the server can process the image on the web page, to implement reduced resource consumption (namely, lower electric power consumption) needed by the terminal device for loading the web page. When the server is a system constituted by a plurality of devices, the HTML code of the web page and the image on the web page can be stored by different devices. Therefore, the device storing the image on the web page processes the image on the web page. Subsequently, one server is used as an execution body for ease of unified description. In other words, the server receiving the request that is dedicated for the web page and sent by the terminal device stores both the HTML code of the web page and the image included by the web page.

The server providing the web page can first divide the image on the web page into several sub-images by using a method same as that in the existing technology, to facilitate subsequent operations. As such, when loading the image on the web page, the terminal device can display the image on the web page without a need to wait until all data of the entire image is loaded.

In addition, because an image cannot be directly written into HTML code, the server can further generate code corresponding to each sub-image based on the sub-images. As such, the code corresponding to each sub-image can be conveniently written into the HTML code of the web page afterwards.

For each sub-image obtained by dividing the image in step S101, the server generates Base64 code corresponding to the sub-image based on the sub-image through a Base64 encoding method, and uses the Base64 code as code corresponding to the sub-image. In addition, the sub-image and the code are in one-to-one mapping relationship. In other words, different images are converted into different code based on the Base64 encoding method.

After generating code corresponding to all the sub-images, the server can write each piece of code into the HTML code of the web page.

The server can write each piece of code into scripting language (JavaScript, JS) code included in the HTML code of the web page. In other words, the code corresponding to each sub-image is written into the JS code, and the JS code including each piece of code is written into the HTML code of the web page. As such, after receiving the HTML code of the web page, the terminal device can render a sub-image corresponding to the code corresponding to each sub-image to the web page by running the JS code included in the HTML code of the web page. Generally, when the image is displayed by using the HTML code of the web page, the image is displayed on the web page by using an image tag (<img> tag) in the HTML code. Therefore, when the terminal device runs the JS code, the JS code can further have each piece of code be written into the <img> tag in the HTML code of the web page, that is, the JS code can be used to write the code into the <img> tag.

After writing each piece of code into the JS code and writing the JS code into the HTML code of the web page, the server can use the HTML code, of the web page, that the JS code has been written into as new HTML code of the web page, and send the new HTML code to the terminal device in subsequent steps. In addition, the server can store the HTML code, of the web page that the JS code has been written into, so that when receiving another request dedicated for the web page subsequently, the server does not need to execute the steps of image division, encoding, and code writing, reducing running load of the server.

Figure 2:
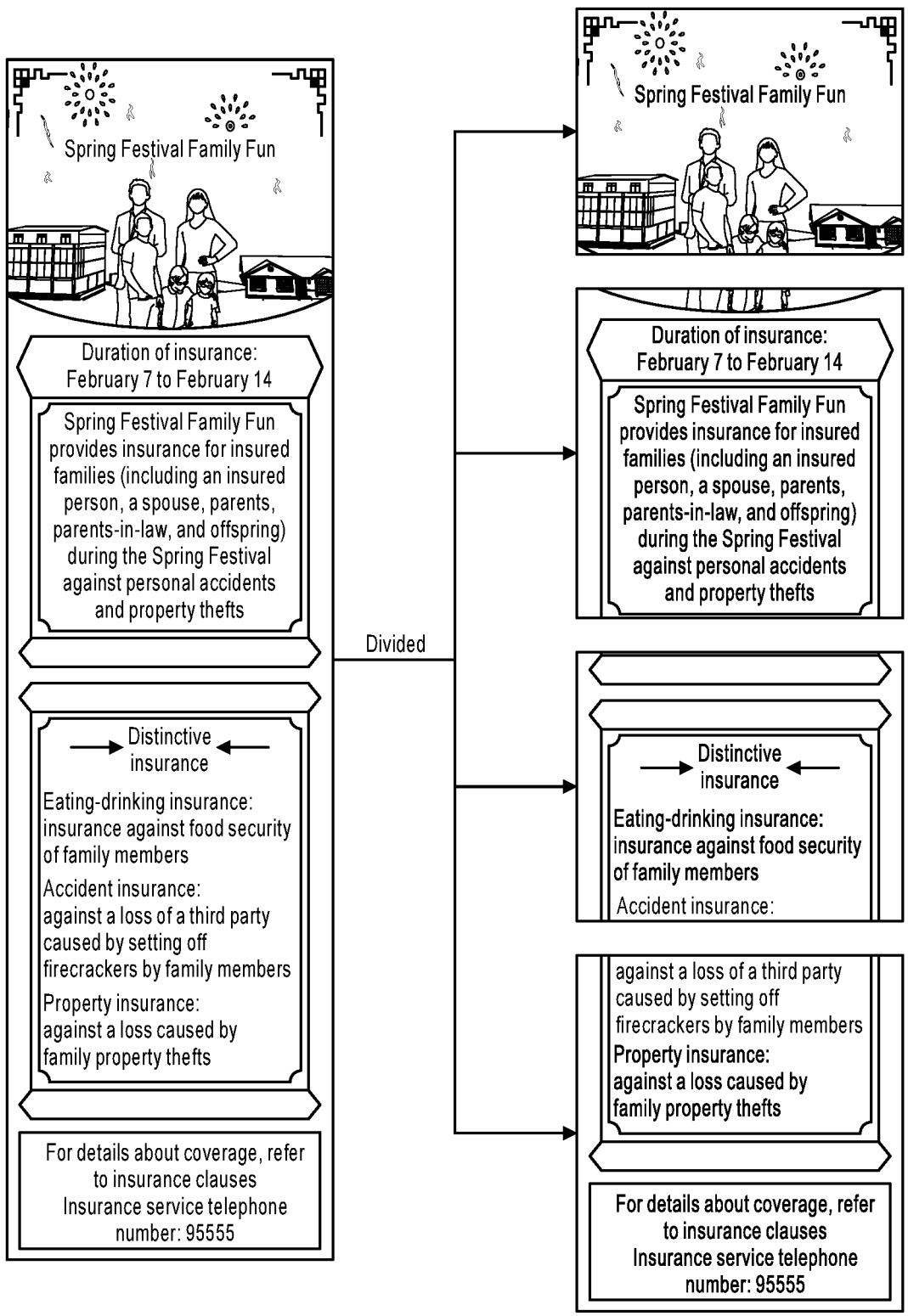
FIG. 2 is a schematic diagram illustrating division of image x into four sub-images, according to an implementation of the present application.

Still in the previous example, server A can first equally separate image x into four sub-images based on a length of image x: sub-image x1, sub-image x2, sub-image x3, and sub-image x4, as shown in FIG. 2. FIG. 2 is a schematic diagram illustrating division of image x into four sub-images, according to an implementation of the present application.

Afterwards, server A can generate code corresponding to each sub-image in the Base64 encoding method. For ease of description, further assume that a mapping relationship between each sub-image and code is shown in Table 1.

TABLE 1

| Sub-image | Code corresponding to the sub-image |
|---|---|
| Sub-image x1 | data:image/jpg;base64,/9j/4QMZRXhpZgAAAgAAAAL....1 |
| Sub-image x2 | data:image/jpg;base64,/9j/4QMZRXhpZgAAAgAAAAL....2 |
| Sub-image x3 | data:image/jpg;base64,/9j/4QMZRXhpZgAAAgAAAAL....3 |
| Sub-image x4 | data:image/jpg;base64,/9j/4QMZRXhpZgAAAgAAAAL....4 |

It can be seen from Table 1 that, each sub-image is one-to-one corresponds to each piece of code, and all pieces of code are different.

Finally, after generating the code corresponding to each sub-image, server A can determine a sorting sequence based on an up-down position relationship of each sub-image in image x, sequentially write the code corresponding to each sub-image into JS code, and write the JS code into HTML code of web page a. Because the sorting sequence of all the sub-images is sub-image x1, sub-image x2, sub-image x3, and sub-image x4, server A can write the code corresponding to each sub-image into the JS code of web page a in a sequence of
data:image/jpg;base64,/9j/4QMZRXhpZgAAAgAAA-AL . . . 1,
data:image/jpg;base64,/9j/4QMZRXhpZgAAAgAAA-AL . . . 2,
data:image/jpg;base64,/9j/4QMZRXhpZgAAAgAAA-AL . . . 3, and
data:image/jpg;base64,/9j/4QMZRXhpZgAAAgAA-jAAL . . . 4, and write the JS code into the HTML code of web page a.

S103: Send the HTML code to the terminal device, so that after receiving the HTML code, the terminal device displays each sub-image based on the code, corresponding to each sub-image, included in the HTML code.

In this implementation of the present application, the server is a server providing the web page. Therefore, after receiving the request that is dedicated for the web page and sent by the terminal device, and determining the HTML code of the web page, the server can send the HTML code of the web page to the terminal device. As such, after receiving the HTML code of the web page, the terminal device can run the HTML code of the web page to display the web page. For the code corresponding to each sub-image, the terminal device can run the JS code included in the HTML code of the web page to write the code into a corresponding <img> tag, and render the sub-image to the web page by using the <img> tag. Finally, when the code corresponding to each sub-image is rendered to the web page, the terminal device can fully display the image.

In the present application, when the terminal device sends the request dedicated for the web page to the server, and the server sends the HTML code of the web page to the terminal device, a communication channel is actually established between the terminal device and the server, and the communication channel is used to transmit the HTML code of the web page.

The image on the web page has been sent to the terminal device in a form of the code corresponding to each sub-image by using the HTML code, and for each piece of code, the terminal device writes the code into the corresponding <img> tag by running the JS code. Therefore, there is no invoking address of a sub-image in the <img> tag, and the terminal device does not need to send an invoking request by using the <img> tag, that is, no need to establish a communication channel. In other words, the terminal device does not need to establish a communication channel for obtaining each sub-image, thereby reducing a quantity of invoking requests sent by the terminal device, and further reducing electric power consumption of the terminal device.

Still in the previous example, assume that server A receives a request sent by a certain terminal device, for invoking web page a, server A can send the HTML code of web page a to the terminal device. After the terminal device receives the HTML code of web page a, for the code, corresponding to each sub-image included in the HTML code of the web page, the terminal device can run the JS code written into the HTML code of the web page, to write the code into the corresponding <img> tag, and eventually display the sub-image corresponding to the code on the terminal device by using the <img> tag. When pieces of code respectively corresponding to sub-image x1, sub-image x2, sub-image x3, and sub-image x4 are all rendered to web page a, the terminal device can fully display image x.

In the data processing method shown in FIG. 1, after the image on the web page is divided into several sub-images, by using the method for generating the code corresponding to each sub-image and writing each piece of code into the HTML code of the web page, the HTML code of the web page and the code corresponding to each sub-image can be jointly sent to the terminal device when the request dedicated for the web page of the terminal device is received. As such, it can be ensured that the terminal device can display the image without a need to wait until all image data is loaded, while a need for sending an invoking request by using a corresponding <img> tag and for establishing a communication channel for the terminal device to load each sub-image is alleviated, thereby reducing electric power consumption of the terminal device, and alleviating a problem that use efficiency of the terminal device is affected due to use time reduction caused by an increase of electric power consumption of the terminal device.

In addition, in step S102 in the present application, the code corresponding to each sub-image can be generated not only in the Base64 encoding method. The server can use other encoding methods to convert each sub-image into the corresponding code, provided that the code corresponding to each sub-image can be written into the JS code, and the terminal device can run the JS code included in the HTML code of the web page to render each sub-image to the web page, without a need to establish a communication channel. The present application imposes no limitation on which encoding method can be used.

Further, in step S102 in the present application, before dividing the image on the web page, the server can further determine whether space occupied by the image reaches a predetermined threshold. If yes, the server determines that the image is relatively large, a time needed by the terminal device to load the image is long, and the server needs to divide the image into several sub-images; or if not, the server determines that the image is relatively small and there is no need to divide the image. The threshold can be set based on experience by operating person.

Still further, the server can equally divide the image into several sub-images based on a length of the image, or equally divide the image into several sub-images based on a width of the image, or divide the image into several sub-images based on a predetermined amount of space (for example, if the predetermined amount of space is 200 kb, the server can divide the image into several sub-images with a size not greater than 200 kb). Certainly, the present application imposes no limitation on how the image is divided. For ease of description, the following uses an example in which the server horizontally divides the image into several equal sub-images for description.

In addition, in step S102 in the present application, when the server writes each piece of code into the HTML code of the web page, for the terminal device to sequentially load, the sub-images in a sequence of dividing the image into the sub-images, after receiving the HTML code of the web page, the server can further record a position of each sub-image in the image, determine a sorting sequence of the sub-images, and sequentially write the code corresponding to each sub-image into the JS code. As such, when the terminal device runs to the JS code afterwards, it can be ensured that the terminal device can display the sub-images in the sorting sequence, and the sub-images are displayed in positions of the sub-images in the image.

Further, when the server records the sorting sequence of the sub-images, the server can further record positions of the sub-images on the web page, in other words, determine the positions of the sub-images on the web page based on a position of the image on the web page and the positions of the sub-images in the image. In addition, the server writes the determined positions of the sub-images into the JS code, further ensuring that the positions of the sub-images displayed on the web page are correct.

It is worthwhile to note that steps of the method provided in this implementation of the present application shown in FIG. 1 can be performed by one device, or the method can be performed by different devices. For example, step S101 and step S102 can be performed by device 1, and step S103 can be performed by device 2. For another example, step S101 can be performed by device 1, and step S102 and step S103 can be performed by device 2, etc.

Figure 3:
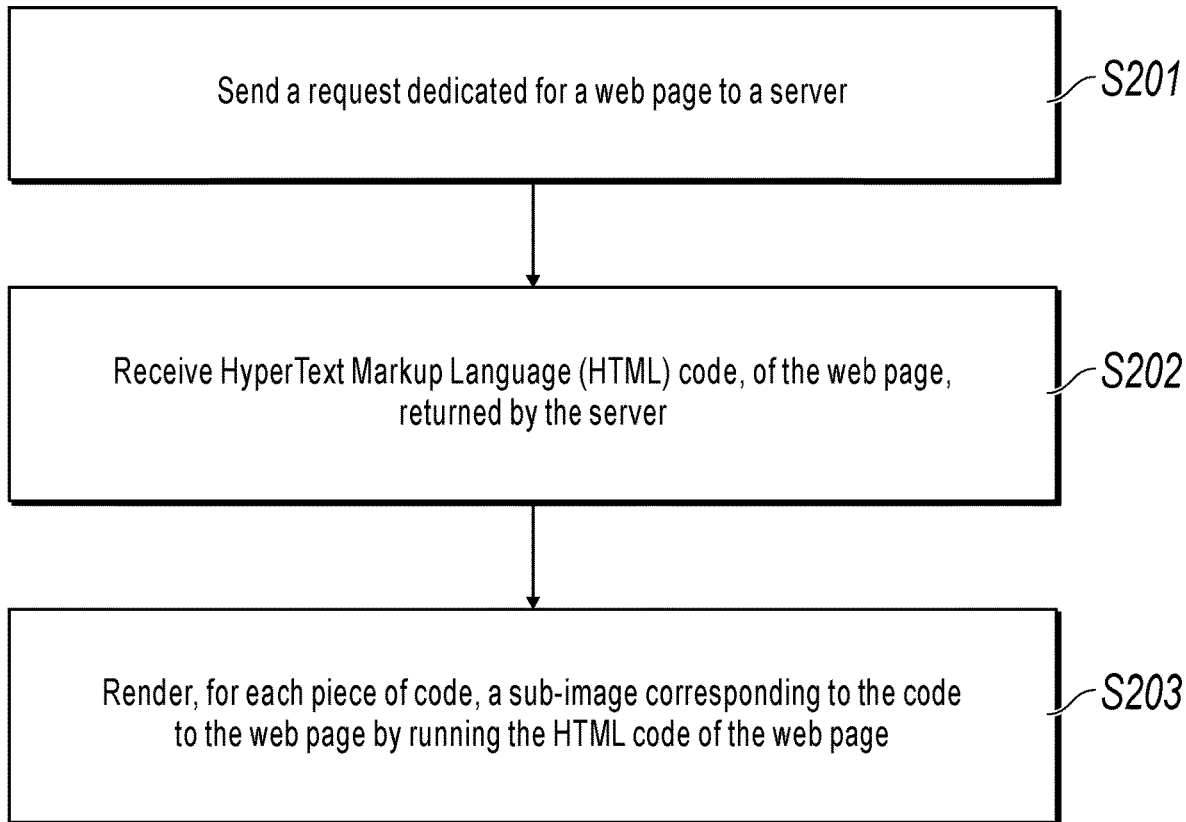
FIG. 3 illustrates a data processing process, according to an implementation of the present application.

Based on the data processing process illustrated in FIG. 1, as shown in FIG. 3, an implementation of the present application further provides a data processing process executed by a terminal device accordingly.

FIG. 3 illustrates a data processing process, according to an implementation of the present application. The process includes the following steps:

S201: Send a request dedicated for a web page to a server.

Same as the existing technology, in this implementation of the present application, when a user browses a web page by using a terminal device, the user first needs to use the terminal device to send a request dedicated for the web page to a server providing the web page, so that after receiving the request, the server can determine HTML code of the web page based on the request, and send the HTML code of the web page to the terminal device. As such, the terminal device can display the web page based on the received HTML code of the web page that is returned by the server.

Therefore, in the present application, the terminal device can send the request dedicated for the web page to the server.

In addition, the terminal device can be a device such as a mobile phone, a tablet computer, or a notebook computer. When the device runs on a power supply (such as a mobile phone battery or a tablet computer battery) built in the device, a higher demand for reduced electric power consumption is imposed. Therefore, the terminal device mentioned in the present application is a device with a built-in power supply by default. Certainly, the present application imposes no limitation thereto, in other words, the terminal device can be a device that runs on electric energy provided by an external power supply.

Still further, the terminal device can use a browser application installed in the terminal device to send the request dedicated for the web page and receive the returned HTML code of the web page. Or, the terminal device can use an application, with a browser kernel, installed in the terminal device to send the request dedicated for the web page and receive the returned HTML code of the web page. The present application imposes no limitation on an application used by the terminal device to receive the HTML code of the web page. For ease of subsequent description, a link of the application in the terminal device is omitted in the present application, and that the terminal device receives the HTML code of the web page is directly used for illustration and description.

For example, assume that a certain user uses his/her own mobile phone c to browse a web page, and in this case, mobile phone c sends a request for invoking web page a to server A.

S202: Receive HTML code, of the web page that is returned by the server.

In this implementation of the present application, after the terminal device sends the request dedicated for the web page to the server, the terminal device can receive the HTML code, of the web page, returned by the server. Afterwards, the terminal device can display the web page on the terminal device by running the HTML code of the web page. The web page includes an image, and the HTML code of the web page can include code corresponding to each of several sub-images obtained by dividing the image.

The HTML code of the web page includes JS code, and code corresponding to the several sub-images is written into the JS code. Each piece of code can be code corresponding to each sub-image obtained by dividing one image, or can be code corresponding to a plurality of sub-images obtained by dividing a plurality of images, that is, in HTML of the web page, there is at least code corresponding to a plurality of sub-images obtained by dividing one image.

Further, if in the JS code, there is the code corresponding to the plurality of sub-images obtained by dividing the plurality of images, for each image, the JS code can further record a mapping relationship between an image identifier of the image and code corresponding to each sub-image obtained by dividing the image. In other words, based on the mapping relationship recorded in the JS code, code corresponding to sub-images obtained by dividing different images can be differentiated, as shown in Table 2.

TABLE 2

| Image | Image identifier | Sub-image | Code corresponding to the sub-image |
| --- | --- | --- | --- |
| Image x | 1 | Sub-image x1 | data:image/jpg;base64,/9j/4QMZRXhp....1 |
| | | Sub-image x2 | data:image/jpg;base64,/9j/4QMZRXhp....2 |
| | | Sub-image x3 | data:image/jpg;base64,/9j/4QMZRXhp....3 |
| Image y | 2 | Sub-image y1 | data:image/jpg;base64,/9j/4DDURXhp....1 |
| | | Sub-image y2 | data:image/jpg;base64,/9j/4DDURXhp....2 |
| Image z | 3 | Sub-image z1 | data:image/jpg;base64,/9j/ST6YSANA....2 |
| | | Sub-image z2 | data:image/jpg;base64,/9j/ST6YSANA....5 |

It can be seen from Table 2 that different images correspond to different image identifiers. Therefore, it can be determined, based on a mapping relationship between an image identifier and code corresponding to a sub-image, which image is divided into the sub-image. For ease of description, subsequent illustration is performed by using an example in which there is only code corresponding to each of several sub-images (for example, sub-image x1, sub-image x2, and sub-image x3) obtained by dividing one image (for example, image x) in the HTML code of the web page. Still in the previous example, assume that server A sends HTML code of web page a to mobile phone c, JS code is written into the HTML code of web page a, and the JS code includes the code corresponding to the several sub-images shown in Table 2.

S203: Render, for each piece of code, a sub-image corresponding to the code to the web page by running the HTML code of the web page.

In this implementation of the present application, after receiving the web page, the terminal device can run the HTML code of the web page, to display the web page on the terminal device. Because the HTML code of the web page includes the JS code, the terminal device also runs the JS code when running the HTML code of the web page. Therefore, for each piece of code included in the JS code, the terminal device can run the JS code to render a sub-image corresponding to the code to the web page.

For each piece of code, because the code is written into the JS code in the HTML code of the web page, the terminal device can run the JS code to establish an <img> tag corresponding to the code, write the code into the <img> tag, and afterwards render a sub-image corresponding to the code to the web page by using the <img> tag.

All pieces of code are sequentially written into the JS code in a sorting sequence. Therefore, when the terminal device runs the JS code, the terminal device can sequentially execute the above-mentioned process in the sequence of all the pieces of code in the JS code. In other words, the terminal device runs the JS code, establishes an <img> tag corresponding to one piece of code, and writes the code into the corresponding <img> tag. Finally, after rendering a sub-image corresponding to the code by using the <img> tag, the terminal device establishes an <img> tag corresponding to a next piece of code based on the sequence of all the pieces of code in the JS code, and renders a sub-image corresponding to the next piece of code to the web page, until sub-images corresponding to all the pieces of code in the JS code are rendered to the web page. In this case, the terminal device displays an image constituted by all the sub-images.

Further, if the JS code further records a position of a sub-image corresponding to each piece of code, the terminal device can further write the position of the sub-image into the <img> tag by running the JS code, so that the terminal device can render the sub-image corresponding to the code to a correct position on the web page by using the <img> tag.

Still in the previous example, assume that the JS code included in the HTML code of web page a includes the code shown in Table 2. When mobile phone c runs the HTML code of the web page a, an <img> tag corresponding to data:image/jpg;base64,/9j/4QMZRXhp . . . 1 can be established by using the JS code. After sub-image x1 is rendered to web page a, <img> tags for pieces of sub-image code corresponding to sub-image x2 and sub-image x3 are sequentially established, and sub-image x2 and sub-image x3 are rendered to web page a. Processing is the same for image y and image z.

If only the code corresponding to sub-image x1 is used for description, for the code corresponding to sub-image x1, mobile phone c first establishes the corresponding <img> tag, and writes the code data:image/jpg;base64,/9j/4QMZRXhp . . . 1 corresponding to sub-image x1 into the <img> tag. Content in the <img> tag can be <img width="40" height="30" src="data:image/jpg;base64,/9j/data:image/jpg;base64,/9j/4QMZRXhp . . . 1"; style="position:absolute; left:100 px; top:100 px;"/>, where style="position:absolute; left:100 px; top:100 px indicates a distance from sub-image x1 to an upper edge of web page a and a distance from sub-image x1 to a left edge of web page a, namely, a position of sub-image x1 on web page a, when sub-image x1 is displayed on web page a. As such, mobile phone c can render sub-image x1 to a specified position on web page a by using the <img> tag.

Further, each sub-image is actually sent to the terminal device in a form of code. Therefore, when loading each sub-image on the web page, the terminal device only needs to render the code corresponding to each sub-image to the web page by using the JS code, without a need to establish a new communication channel for each sub-image or send an invoking request for invoking the sub-image, thereby greatly reducing electric power consumption of the terminal device.

It is worthwhile to note that, the steps in the method provided in the implementation of the present application illustrated in FIG. 3 are executed by one device.

Figure 4:
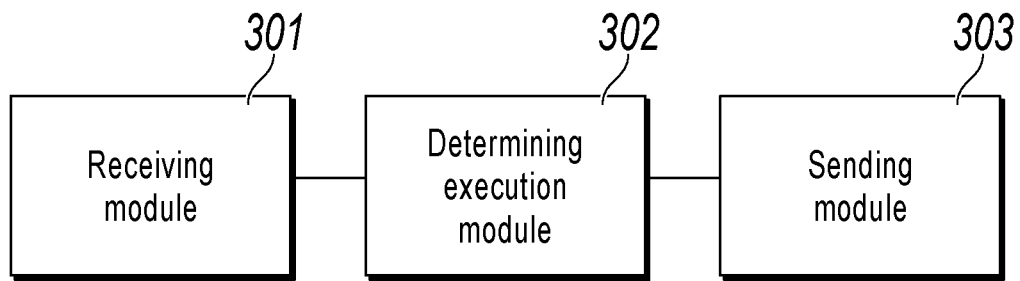
FIG. 4 is a schematic structural diagram illustrating a data processing device, according to an implementation of the present application.

Based on the data processing process illustrated in FIG. 1, as shown in FIG. 4, an implementation of the present application further accordingly provides a data processing device.

FIG. 4 is a schematic structural diagram illustrating a data processing device, according to an implementation of the present application. The data processing device includes the following: a receiving module 301, configured to receive a request, dedicated for a web page, sent by a terminal device, where the web page includes an image; an determination module 302, configured to determine HTML code of the web page, where the HTML code includes code corresponding to each sub-image, and all sub-images are obtained by dividing the image; and a sending module 303, configured to send the HTML code to the terminal device, so that after receiving the HTML, the terminal device displays each sub-image based on the code, corresponding to each sub-image, included in the HTML code.

Space occupied by the described image is greater than a predetermined amount of space; and the determination module 302 divides the image into several sub-images, where space occupied by each sub-image is not greater than the predetermined amount of space.

The code corresponding to each sub-image includes Base64 code.

The determination module 302 determines the code corresponding to each sub-image obtained by dividing the image; writes each piece of code into scripting language code, where the scripting language code includes JavaScript code; writes the scripting language code into the HTML code of the web page; and uses HTML code that the scripting language code has been written into as new HTML code of the web page.

The determination module 302 determines a sorting sequence of all the sub-images based on a position relationship between the sub-images in the image; and sequentially writes the code corresponding to each sub-image into the scripting language code based on the sorting sequence.

The data processing device shown in FIG. 4 can be located in one device, or in a system constituted by a plurality of devices.

Figure 5:
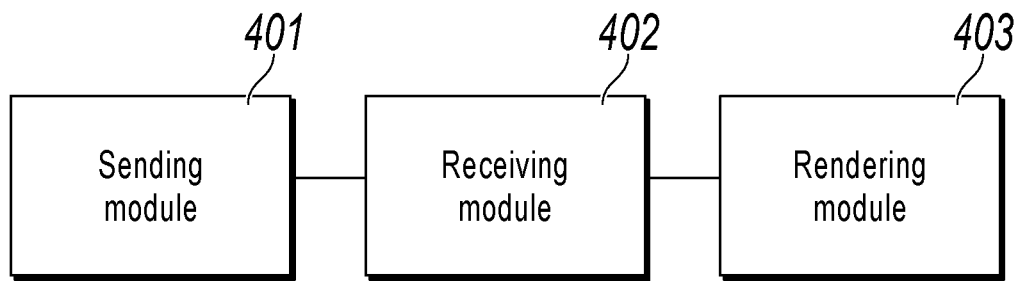
FIG. 5 is a schematic structural diagram illustrating a data processing device, according to an implementation of the present application.

Based on the data processing process illustrated in FIG. 3, as shown in FIG. 5, an implementation of the present application further accordingly provides a data processing device.

FIG. 5 is a schematic structural diagram illustrating a data processing device, according to an implementation of the present application. The data processing device includes the following: a sending module 401, configured to send a request dedicated for a web page to a server; a receiving module 402, configured to receive HTML code, of the web page, returned by the server, where the web page includes an image, and the HTML code of the web page includes code corresponding to each of several sub-images obtained by dividing the image; and a rendering module 403, configured to render, for each piece of code, a sub-image corresponding to the code to the web page by running the HTML code of the web page.

The HTML code of the web page includes scripting language code, and the scripting language code includes the code corresponding to each of the several sub-images obtained by dividing the image; and the scripting language code includes JavaScript code.

The rendering module 403 runs the scripting language code included in the HTML code of the web page; and sequentially renders a sub-image corresponding to each piece of code written into the scripting language code to the web page by using the scripting language code.

The rendering module 403 establishes, for each piece of code, an image tag corresponding to the code; writes the code into the established image tag; and renders the sub-image corresponding to the code to the web page by using the image tag.

The device can be located in a terminal device, such as a mobile phone, a tablet computer, a notebook computer, or a personal computer.

A person skilled in the art should understand that the implementations of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a magnetic disk storage, a CD-ROM, and an optical memory) that include computer-usable program code.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or the another programmable data processing device to work in a specific method, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory can include a non-persistent storage, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. A computer storage medium includes but is not limited to a phase-change random access memory (PRAM), a static random access memory (SRAM), a dynamic random access memory (DRAM), a random access memory (RAM) of another type, a read-only memory, an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by the computing device. Based on the definition in the present specification, the computer readable medium does not include transitory computer-readable media (transitory media), for example, a modulated data signal and carrier.

It is worthwhile to further note that the terms "include", "comprise", or their any other variant is intended to cover a non-exclusive inclusion, so that a process, a method, an article, or a device that includes a list of elements not only includes those elements but also includes other elements which are not expressly listed, or further includes elements inherent to such process, method, article, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a magnetic disk storage, a CD-ROM, and an optical memory) that include computer-usable program code.

The previous descriptions are merely implementations of the present application, and are not intended to limit the present application. For a person skilled in the art, the present application can have various modifications and changes. Any modifications, equivalent substitutions, improvements, etc. made in the spirit and principle of the present application shall fall in the scope of the claims in the present application.

Figure 6:
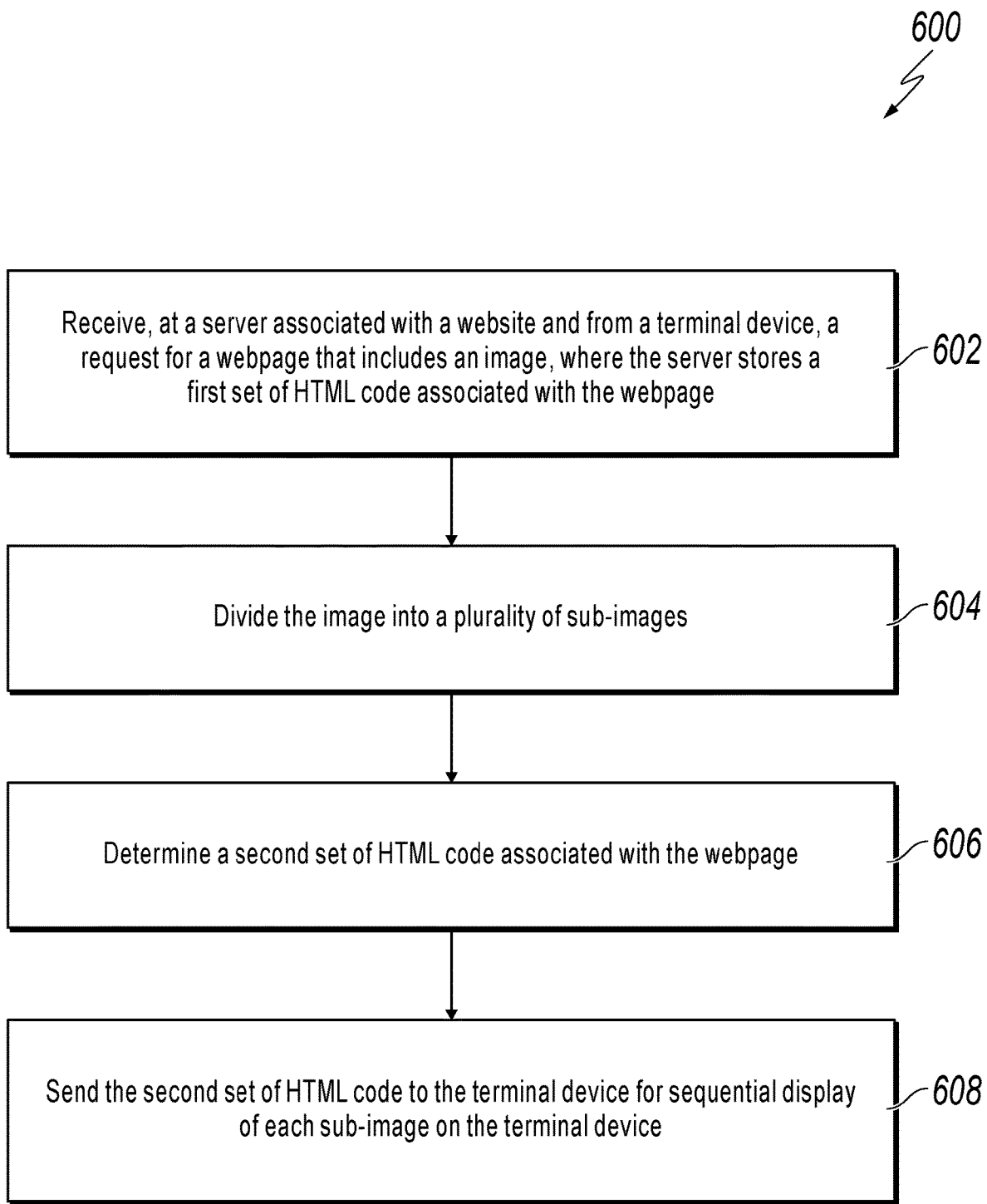
FIG. 6 is a flowchart illustrating an example of a computer-implemented method for processing image data of a webpage, according to an implementation of the present disclosure.

FIG. 6 is a flowchart illustrating an example of a computer-implemented method 600 for processing image data of a webpage according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602 a server associated with a website receives a request for a webpage from a terminal device, where the webpage includes an image, and where the server stores a first set of HyperText Markup Language (HTML) code that is associated with the webpage. After 602, process 600 proceeds to 604.

At 604, the server divides the image into a number of sub-images. After 604, process 600 proceeds to 606.

At 606, the server determines a second set of HTML code associated with the webpage, where the second set of HTML code includes code corresponding to each sub-image. In some implementations, determining a second set of HTML code associated with the webpage includes generating code corresponding to each sub-image; determining a sorting sequence of the sub-images based on an up-down position relationship between the sub-images; sequentially writing the code corresponding to each sub-image into JavaScript (JS) code that is included in the first set of the HTML code based on the sorting sequence; and determining the second set of HTML code, where the second set of HTML code is generated by writing the JS code that includes the generated code corresponding to each sub-image into the first set of HTML code.

In some implementations, generating code corresponding to each sub-image includes generating Base64 code corresponding to the sub-image through a Base64 encoding method. In some implementations, the server stores the second set of HTML code. After 606, process 600 proceeds to 608.

At 608, the server transmits the second set of HTML code to the terminal device for sequential display of each sub-image on the terminal device.

In some implementations, after the terminal device receives the second set of HTML code, the process 600 further includes running, by the terminal device, the JS code included in the second set of HTML code to write the code corresponding to each sub-image into a corresponding image tag; and rendering each sub-image to the webpage by using the corresponding image tag. In some implementations, the image is fully displayed on the terminal device after each sub-image is rendered to the webpage. In some implementations, the terminal device sequentially renders each sub-image based on the sorting sequence. After 608, process 600 can stop.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   receiving, at a server associated with a website and from a terminal device, a request for a webpage, wherein the webpage comprises an image, and wherein the server stores a first set of HyperText Markup Language (HTML) code that is associated with the webpage;
   dividing, the image into a plurality of sub-images;
   determining, a second set of HTML code associated with the webpage, wherein the determining of the second set of HTML code comprises:
      generating a code encoding each sub-image, and the code is a renderable code corresponding to each sub-image of the webpage;
      determining a sorting sequence of the sub-images based on an up-down position relationship between the sub-images;
      sequentially writing the renderable code corresponding to each sub-image into JavaScript (JS) code that is included in the first set of HTML code based on the sorting sequence; and
      generating the second set of HTML code, wherein the second set of HTML code is generated by writing the JS code that includes the renderable code corresponding to each sub-image into the first set of HTML code; and
   transmitting, using a single communication channel between the server and the terminal device, the second set of HTML code comprising an encoded plurality of sub-images to the terminal device for sequential display of each sub-image on the terminal device.

2. The computer-implemented method of claim 1, wherein generating the code corresponding to each sub-image further comprises generating Base64 code corresponding to the sub-image through a Base64 encoding method.

3. The computer-implemented method of claim 1, further comprising:
   receiving, at the terminal device, the second set of HTML, code;
   running the JS code included in the second set of HTML code to write the renderable code corresponding to each sub-image into a corresponding image tag; and
   rendering each sub-image to the webpage by using the corresponding image tag.

4. The computer-implemented method of claim 1, wherein the image is fully displayed on the terminal device after each sub-image is rendered to the webpage.

5. The computer-implemented method of claim 1, further comprising storing, by the server, the second set of HTML code.

6. The computer-implemented method of claim 1, further comprising sequentially rendering, by the terminal device, each sub-image based on the sorting sequence.

7. A non-transitory, computer-readable medium storing one or more instructions executable by a computer system to perform operations comprising:
   receiving, at a server associated with a website and from a terminal device, a request for a webpage, wherein the webpage comprises an image, and wherein the server stores a first set of HyperText Markup Language (HTML) code that is associated with the webpage;
   dividing, the image into a plurality of sub-images;
   determining, a second set of HTML code associated with the webpage, wherein the determining of the second set of HTML code comprises;
      generating a code encoding each sub-image, and the code is a renderable code corresponding to each sub-image of the webpage;
      determining a sorting sequence of the sub-images based on an up-down position relationship between the sub-images;

sequentially writing the renderable code corresponding to each sub-image into JavaScript (JS) code that is included in the first set of HTML code based on the sorting sequence; and generating the second set of HTML code, wherein the second set of HTML code is generated by writing the JS code that includes the renderable code corresponding to each sub-image into the first set of HTML code; and transmitting, using a single communication channel between the server and the terminal device, the second set of HTML code comprising an encoded plurality of sub-images to the terminal device for sequential display of each sub-image on the terminal device.

8. The non-transitory, computer-readable medium of claim 7, wherein generating the code corresponding to each sub-image further comprises generating Base64 code corresponding to the sub-image through a Base64 encoding method.

9. The non-transitory, computer-readable medium of claim 7, further comprising:
receiving, at the terminal device, the second set of HTML code;
running the JS code included in the second set of HTML code to write the renderable code corresponding to each sub-image into a corresponding image tag; and
rendering each sub-image to the webpage by using the corresponding image tag.

10. The non-transitory, computer-readable medium of claim 7, wherein the image is fully displayed on the terminal device after each sub-image is rendered to the webpage.

11. The non-transitory, computer-readable medium of claim 7, further comprising storing, by the server, the second set of HTML code.

12. The non-transitory, computer-readable medium of claim 7, further comprising sequentially rendering, by the terminal device, each sub-image based on the sorting sequence.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, at a server associated with a website and from a terminal device, a request for a webpage, wherein the webpage comprises an image, and wherein the server stores a first set of HyperText Markup Language (HTML) code that is associated with the webpage;
dividing, the image into a plurality of sub-images;
determining, a second set of HTML code associated with the webpage, wherein the determining of the second set of HTML code comprises:
generating a code encoding each sub-image, and the code is a renderable code corresponding to each sub-image of the webpage;
determining a sorting sequence of the sub-images based on an up-down position relationship between the sub-images;
sequentially writing the renderable code corresponding to each sub-image into JavaScript (JS) code that is included in the first set of HTML code based on the sorting sequence; and
generating the second set of HTML code, wherein the second set of HTML code is generated by writing the JS code that includes the renderable code corresponding to each sub-image into the first set of HTML code; and
transmitting, using a single communication channel between the server and the terminal device, the second set of HTML code comprising an encoded plurality of sub-images to the terminal device for sequential display of each sub-image on the terminal device.

14. The computer-implemented system of claim 13, wherein generating the code corresponding to each sub-image further comprises generating Base64 code corresponding to the sub-image through a Base64 encoding method.

15. The computer-implemented system of claim 13, further comprising:
receiving, at the terminal device, the second set of HTML, code;
running the JS code included in the second set of HTML code to write the renderable code corresponding to each sub-image into a corresponding image tag; and
rendering each sub-image to the webpage by using the corresponding image tag.

16. The computer-implemented system of claim 13, wherein the image is fully displayed on the terminal device after each sub-image is rendered to the webpage.

17. The computer-implemented system of claim 13, further comprising storing, by the server, the second set of HTML code.

* * * * *